United States Patent
Lee et al.

(10) Patent No.: US 9,281,120 B2
(45) Date of Patent: Mar. 8, 2016

(54) MULTILAYER CERAMIC ELECTRONIC COMPONENT AND BOARD HAVING THE SAME MOUNTED THEREON

(71) Applicant: SAMSUNG ELECTRO-MECHANICS CO., LTD., Suwon, Gyunggi-do (KR)

(72) Inventors: Min Gon Lee, Gyunggi-do (KR); Jong Han Kim, Gyunggi-do (KR); Seung Ho Lee, Gyunggi-do (KR); Yoon Hee Lee, Gyunggi-do (KR); Jang Ho Lee, Gyunggi-do (KR)

(73) Assignee: SAMSUNG ELECTRO-MECHANICS CO., LTD., Suwon-Si, Gyeonggi-Do (KR)

( * ) Notice: Subject to any disclaimer, the term of this patent is extended or adjusted under 35 U.S.C. 154(b) by 211 days.

(21) Appl. No.: 14/174,625

(22) Filed: Feb. 6, 2014

(65) Prior Publication Data
US 2015/0136462 A1    May 21, 2015

(30) Foreign Application Priority Data
Nov. 21, 2013    (KR) .................. 10-2013-0142073

(51) Int. Cl.
| | |
|---|---|
| *H01G 2/06* | (2006.01) |
| *H01G 4/30* | (2006.01) |
| *H01G 4/012* | (2006.01) |
| *H01G 4/232* | (2006.01) |
| *H01G 4/12* | (2006.01) |

(52) U.S. Cl.
CPC ............ *H01G 2/065* (2013.01); *H01G 4/012* (2013.01); *H01G 4/232* (2013.01); *H01G 4/30* (2013.01); *H01G 4/12* (2013.01)

(58) Field of Classification Search
CPC ....... H01G 2/065; H01G 4/248; H01G 4/005; H01G 4/06; H01G 4/228; H01G 4/232; H01G 4/12; H01G 4/012; H01G 4/30; H05K 1/0231; H05K 1/181; H05K 1/18; H01C 1/148; H01C 7/18; H01C 7/13; H01L 41/0471; H01L 41/047; Y10T 29/435
USPC ................. 174/261; 361/301.4, 306.3, 321.1, 361/321.3, 321.2, 306.1, 305, 311, 309, 361/303; 310/366; 338/22 R; 29/25.42
See application file for complete search history.

(56) References Cited

U.S. PATENT DOCUMENTS

| | | | | |
|---|---|---|---|---|
| 5,277,723 | A | * 1/1994 | Kodama | .................. B32B 18/00 156/288 |
| 2005/0264975 | A1 | * 12/2005 | Yamazaki | ................ H01C 1/02 361/301.1 |

(Continued)

FOREIGN PATENT DOCUMENTS

| | | |
|---|---|---|
| JP | 2000-164451 A | 6/2000 |
| KR | 10-0586962 B1 | 6/2006 |
| KR | 10-2011-0134866 A | 12/2011 |

*Primary Examiner* — Timothy Thompson
*Assistant Examiner* — Guillermo Egoavil
(74) *Attorney, Agent, or Firm* — McDermott Will & Emery LLP

(57) ABSTRACT

There is provided a multilayer ceramic electronic component including: a ceramic body including dielectric layers; and a plurality of internal electrodes disposed in the ceramic body, having at least one of the dielectric layers interposed therebetween, wherein when a distance between a widthwise end of an internal electrode disposed at a central portion of the ceramic body in a thickness direction thereof and an adjacent side surface of the ceramic body is defined as D1 and a distance between a widthwise end of an internal electrode disposed at an upper or lower portion of the ceramic body in the thickness direction thereof and the adjacent side surface of the ceramic body is defined as D2, D1/D2 is in a range of 0.5 to 0.95 ($0.5 \leq D1/D2 \leq 0.95$).

11 Claims, 4 Drawing Sheets

(56) References Cited

U.S. PATENT DOCUMENTS

2011/0141659 A1* 6/2011 Chang .................. H01G 4/012
361/321.2

2013/0009516 A1* 1/2013 Kim ..................... H01G 4/30
310/311

2013/0135789 A1* 5/2013 Kim ..................... H01G 4/12
361/321.2

* cited by examiner

MULTILAYER CERAMIC ELECTRONIC COMPONENT AND BOARD HAVING THE SAME MOUNTED THEREON

CROSS-REFERENCE TO RELATED APPLICATION

This application claims the benefit of Korean Patent Application No. 10-2013-0142073 filed on Nov. 21, 2013, with the Korean Intellectual Property Office, the disclosure of which is incorporated herein by reference.

BACKGROUND

The present disclosure relates to a multilayer ceramic electronic component and a board having the same mounted thereon.

In general, electronic components using a ceramic material, such as a capacitor, an inductor, a piezoelectric element, a varistor, a thermistor, or the like, include a ceramic body formed of a ceramic material, internal electrodes formed in the ceramic body, and external electrodes mounted on surfaces of the ceramic body so as to be connected to the internal electrodes.

Among ceramic electronic components, a multilayer ceramic capacitor includes a plurality of dielectric layers stacked therein, internal electrodes disposed to face each other, having one of the dielectric layers interposed therebetween, and external electrodes electrically connected to the internal electrodes.

The multilayer ceramic capacitor has been widely used as a component for a mobile communications device such as a computer, a personal data assistant (PDA), a mobile phone, or the like, due to advantages such as a small size, high capacitance, easiness of mounting, or the like.

Recently, in accordance with the trend toward high performance, slimness and lightness of electric and electronic devices, electronic components are needed to have a small size, high performance, and high capacitance. Particularly, as a speed of a central processing unit (CPU) has increased and a device has became miniaturized, light, digitalized, and high-functional, research into a technology of implementing characteristics such as miniaturization, thinness, high capacitance, or the like, of the multilayer ceramic capacitor has been actively conducted.

In addition, the multilayer ceramic capacitor has been usefully used as a bypass capacitor disposed in a power supply circuit of a large-scale integration (LSI). The multilayer ceramic capacitor should effectively remove high frequency noise in order to serve as the bypass capacitor. This demand has been further increased in accordance with the trend toward electronic devices having a high frequency. The multilayer ceramic capacitor used as the bypass capacitor may be electrically connected to a mounting pad on a circuit board through soldering, and the mounting pad may be connected to other external circuits through wiring patterns or conductive vias on the circuit board.

RELATED ART DOCUMENT (Patent Document 1) Korean Patent No. 10-0586962

SUMMARY

An aspect of the present disclosure may provide a multilayer ceramic electronic component having high capacitance and improved reliability and a board having the same mounted thereon.

According to an aspect of the present disclosure, a multilayer ceramic electronic component may include: a ceramic body including dielectric layers; and a plurality of internal electrodes disposed in the ceramic body, having at least one of the dielectric layers interposed therebetween, wherein when a distance between a widthwise end of an internal electrode disposed at a central portion of the ceramic body in a thickness direction thereof and an adjacent side surface of the ceramic body is defined as D1 and a distance between a widthwise end of an internal electrode disposed at an upper or lower portion of the ceramic body in the thickness direction thereof and the adjacent side surface of the ceramic body is defined as D2, D1/D2 is in a range of 0.5 to 0.95 ($0.5 \leq D1/D2 \leq 0.95$).

When a thickness of a central internal electrode is defined as a and a thickness of a cover portion internal electrode is defined as b, a may be greater than b (a>b).

When a thickness of a central internal electrode is defined as a and a thickness of a cover portion internal electrode is defined as b, a/b may be in a range of 1.05 to 1.80 ($1.05 \leq a/b \leq 1.80$).

When a thickness of a central internal electrode is defined as a and a thickness of the dielectric layer is defined as Td, a/Td may be in a range of 0.5 to 1.2 ($0.5 \leq a/Td \leq 1.2$).

A thickness of a central internal electrode may be 0.1 μm to 0.5 μm.

A thickness of the dielectric layer may be 0.6 μm or less.

Average electrode continuity of the internal electrodes may be 85% or more.

According to another aspect of the present disclosure, a board having a multilayer ceramic electronic component mounted thereon, the board may include: a printed circuit board having electrode pads thereon; and the multilayer ceramic electronic component mounted on the printed circuit board, wherein the multilayer ceramic electronic component includes a ceramic body including dielectric layers and a plurality of internal electrodes disposed in the ceramic body, having at least one of the dielectric layers interposed therebetween, and when a distance between a widthwise end of an internal electrode disposed at a central portion of the ceramic body in a thickness direction thereof and an adjacent side surface of the ceramic body is defined as D1 and a distance between a widthwise end of an internal electrode disposed at an upper or lower portion of the ceramic body in the thickness direction thereof and the adjacent side surface of the ceramic body is defined as D2, D1/D2 may be in a range of 0.5 to 0.95 ($0.5 \leq D1/D2 \leq 0.95$).

When a thickness of a central internal electrode is defined as a and a thickness of a cover portion internal electrode is defined as b, a may be greater than b (a>b).

When a thickness of a central internal electrode is defined as a and a thickness of a cover portion internal electrode is defined as b, a/b may be in a range of 1.05 to 1.80 ($1.05 \leq a/b \leq 1.80$).

When a thickness of a central internal electrode is defined as a and a thickness of the dielectric layer is defined as Td, a/Td may be in a range of 0.5 to 1.2 ($0.5 \leq a/Td \leq 1.2$).

BRIEF DESCRIPTION OF DRAWINGS

The above and other aspects, features and other advantages of the present disclosure will be more clearly understood from the following detailed description taken in conjunction with the accompanying drawings, in which.

DETAILED DESCRIPTION

Figure 1:
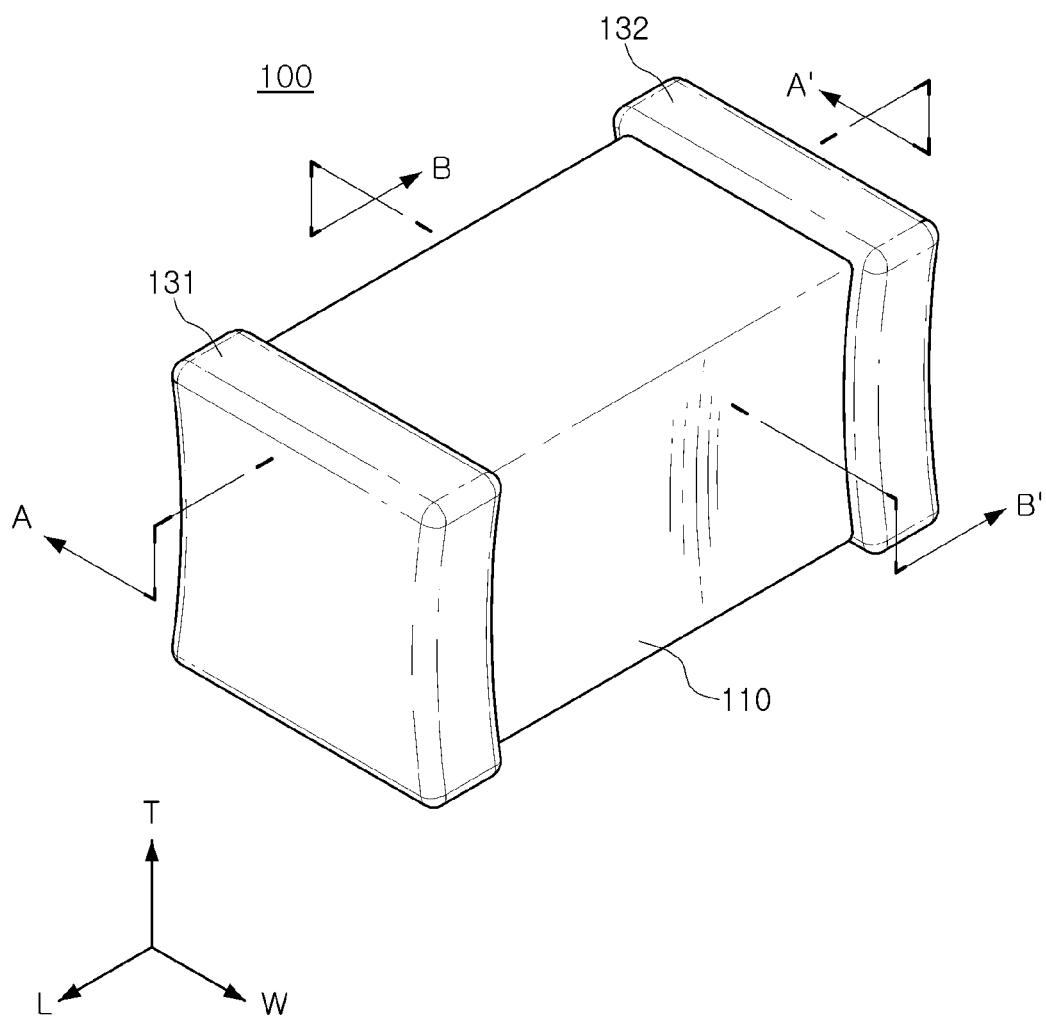
FIG. 1 is a schematic perspective view of a multilayer ceramic capacitor according to an exemplary embodiment of the present disclosure.

Exemplary embodiments of the present disclosure will now be described in detail with reference to the accompanying drawings.

The disclosure may, however, be exemplified in many different forms and should not be construed as being limited to the specific embodiments set forth herein. Rather, these embodiments are provided so that this disclosure will be thorough and complete, and will fully convey the scope of the disclosure to those skilled in the art.

In the drawings, the shapes and dimensions of elements may be exaggerated for clarity, and the same reference numerals will be used throughout to designate the same or like elements.

Multilayer Ceramic Electronic Component

Exemplary embodiments of the present disclosure relate to a multilayer ceramic electronic component, and examples of an electronic component using a ceramic material may include a capacitor, an inductor, a piezoelectric element, a varistor, a thermistor, or the like. Hereinafter, a multilayer ceramic capacitor will be described as an example of the multilayer ceramic electronic component.

FIG. 1 is a schematic perspective view illustrating a multilayer ceramic capacitor according to an exemplary embodiment of the present disclosure.

FIG. 2 is a schematic cross-sectional view of the multilayer ceramic capacitor, taken along line A-A' of FIG. 1.

Figure 2A:
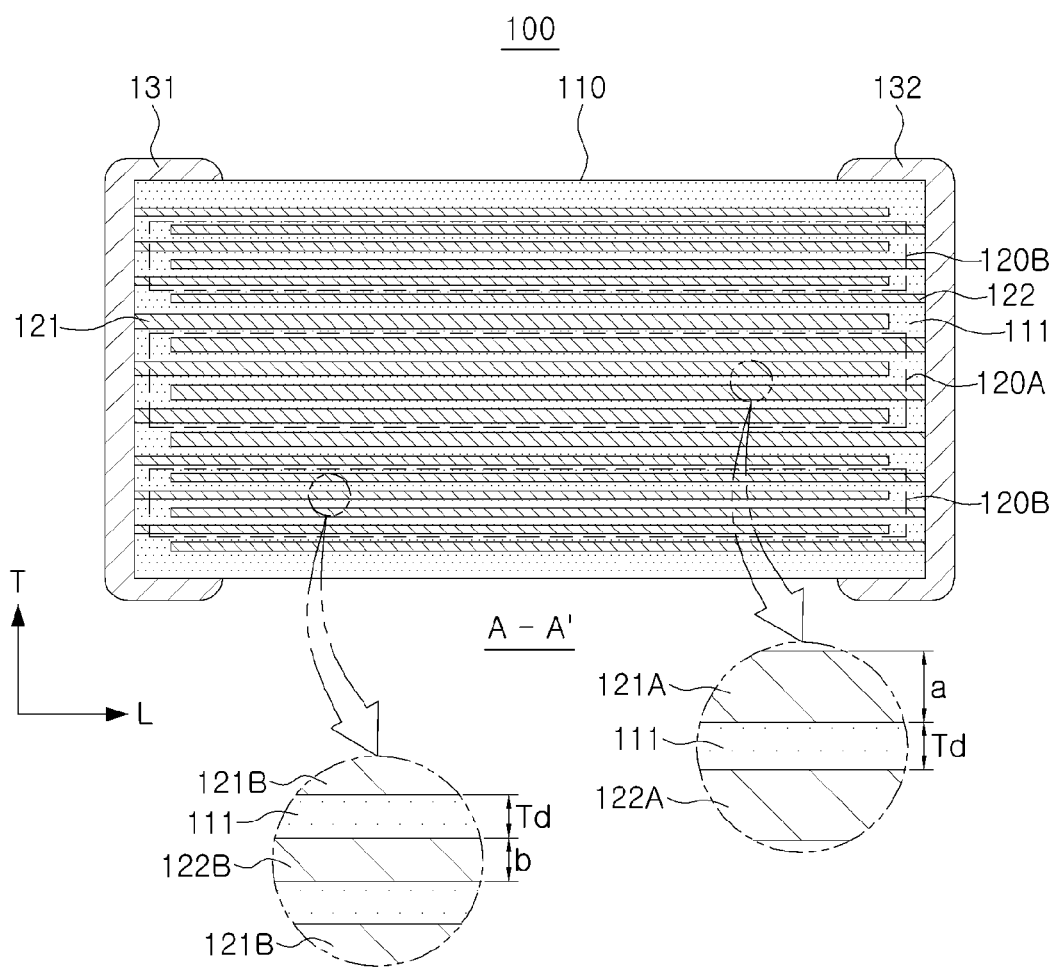
FIG. 2A is a schematic cross-sectional view of the multilayer ceramic capacitor, taken along line A-A' of FIG. 1.
Figure 2B:
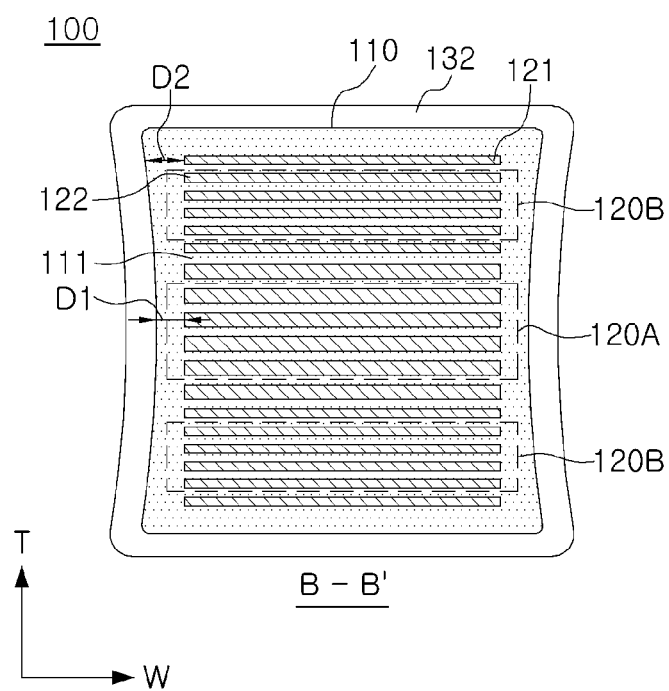
FIG. 2B is schematic cross-sectional view of the multilayer ceramic capacitor, taken along line B-B' of FIG. 1.

FIG. 2B is schematic cross-sectional view of the multilayer ceramic capacitor, taken along line B-B' of FIG. 1.

According to an exemplary embodiment of the present disclosure, there is provided a multilayer electronic ceramic component including a ceramic body 110 including dielectric layers 111; and a plurality of internal electrodes 121 and 122 disposed in the ceramic body, having at least one of the dielectric layers interposed therebetween, wherein when a distance between a widthwise end of an internal electrode disposed at a central portion of the ceramic body in a thickness direction of the ceramic body and an adjacent side surface of the ceramic body is defined as D1, and a distance between a widthwise end of an internal electrode disposed at an upper or lower portion of the ceramic body in the thickness direction of the ceramic body and the adjacent side surface of the ceramic body is defined as D2, D1/D2 is in a range of 0.5 to 0.95 ($0.5 \leq D1/D2 \leq 0.95$).

In the exemplary embodiment of the present disclosure, a 'length direction' of the multilayer ceramic capacitor refers to an 'L' direction of FIG. 1, a 'width direction' thereof refers to a 'W' direction of FIG. 1, and a 'thickness direction' thereof refers to a 'T' direction of FIG. 1. The 'thickness direction' is the same as a direction in which dielectric layers are stacked, that is, the 'stacked direction'.

Referring to FIGS. 1 through 2B, the multilayer ceramic capacitor according to this exemplary embodiment may include the ceramic body 110 including the dielectric layers 111, the internal electrodes 121 and 122 formed in the ceramic body 110 and disposed to face each other, having at least one of the dielectric layers interposed therebetween, and external electrodes 131 and 132 formed on outer surfaces of the ceramic body 110.

A shape of the ceramic body 110 is not particularly limited, but the ceramic body 110 according to this exemplary embodiment may have a hexahedral shape.

In the exemplary embodiment of the present disclosure, the ceramic body 110 may have first and second main surfaces opposing each other in the thickness direction, first and second side surfaces opposing each other in the width direction, and first and second end surfaces opposing each other in the length direction, and the first and second main surfaces may be referred to as upper and lower surfaces of the ceramic body 110, respectively.

The ceramic body 110 may be formed by stacking the plurality of dielectric layers 111.

The plurality of dielectric layers 111 forming the ceramic body 110 may be in a sintered state, so that boundaries between adjacent dielectric layers 111 are not readily apparent.

The dielectric layer 111 may be formed by sintering a ceramic green sheet containing ceramic powder.

The ceramic powder may be any material generally used in the art without being particularly limited.

The ceramic powder may include, for example, $BaTiO_3$-based ceramic powder, but is not limited thereto.

The $BaTiO_3$-based ceramic powder may include, for example, $(Ba_{1-x}Ca_x)TiO_3$, $Ba(Ti_{1-y}Ca_y)O_3$, $(Ba_{1-x}Ca_x)(Ti_{1-y}Zr_y)O_3$, $Ba(Ti_{1-y}Zr_y)O_3$, or the like, in which Ca, Zr, or the like, is partially dissolved in $BaTiO_3$, but is not limited thereto.

In addition, the ceramic green sheet may contain a transition metal, a rare earth material, Mg, Al, and the like, in addition to the ceramic powder.

A thickness of one dielectric layer 111 may be appropriately changed depending on a target capacitance of the multilayer ceramic capacitor.

Although not limited thereto, the thickness of the dielectric layer 111 formed between two adjacent internal electrodes after sintering may be 0.6 μm or less.

That is, as shown in FIG. 2A, when the thickness of one dielectric layer 111 is defined as Td, Td may be 0.6 μm or less (Td≤0.6 μm).

The internal electrodes 121 and 122 may be formed in the ceramic body 10 and include a first internal electrode 121 and a second internal electrode 122.

The first and second internal electrodes 121 and 122 may be formed on the ceramic green sheets and be then stacked. The first and second internal electrodes 121 and 122 may be formed by sintering while being disposed within the ceramic body 110, having the dielectric layer interposed therebetween.

The first and second internal electrodes 121 and 122 may have opposite polarities and be disposed to face each other in a direction in which the dielectric layers are stacked.

As shown in FIG. 2A, one ends of the first and second internal electrodes 121 and 122 may be alternately exposed to the first and second end surfaces of the ceramic body 110 opposing each other in the length direction of the ceramic body. For example, the first internal electrode 121 may be exposed to the first end surface of the ceramic body, and the second internal electrode 122 may be exposed to the second end surface of the ceramic body.

A kind of conductive metal forming the first and second internal electrodes 121 and 122 is not particularly limited, but, for example, a base metal may be used.

Although not limited thereto, the conductive metal may include, for example, at least one of nickel (Ni), manganese (Mn), chromium (Cr), cobalt (Co), aluminum (Al), and alloys thereof.

According to the exemplary embodiment of the present disclosure, in the case in which a distance between a widthwise end of an internal electrode disposed at a central portion of the ceramic body in the thickness direction of the ceramic body and an adjacent side surface of the ceramic body is defined as D1, and a distance between a widthwise end of an internal electrode disposed at an upper or lower portion of the ceramic body in the thickness direction of the ceramic body and the adjacent side surface of the ceramic body is defined as D2, D1/D2 may be in a range of 0.5 to 0.95 ($0.5 \leq D1/D2 \leq 0.95$).

D1 and D2 may be measured at a cross section of the ceramic body in a width-thickness direction thereof. For example, as shown in FIG. 2B, in the cross-section of the ceramic body in the width-thickness direction at a central portion of the ceramic body in the length direction thereof, the distance between the widthwise end of the internal electrode disposed at the central portion of the ceramic body and the adjacent side surface of the ceramic body may be defined as D1, and the distance between the widthwise end of the internal electrode disposed at the upper or lower portion of the ceramic body and the adjacent side surface of the ceramic body may be defined as D2.

Meanwhile, in the cross-section of the ceramic body in the width-thickness direction, a region of the ceramic body having no internal electrode in the width direction may be defined as a margin portion in the width direction, D1 denotes a width of the margin portion in the width direction measured at the central portion of the ceramic body in the thickness direction of the ceramic body (hereinafter, also referred to as the "central margin portion"), and D2 denotes a width of the margin portion in the width direction measured at the upper or lower portion of the ceramic body in the thickness direction of the ceramic body (hereinafter, also referred to as the "upper or lower margin portion").

D1 and D2 values may be measured by calculating average values of distances from the widthwise ends of the plurality of internal electrodes disposed at the central portion and the upper or lower portion of the ceramic body to one side surface of the ceramic body adjacent thereto, respectively.

For example, respective distances from widthwise ends of two to four internal electrodes disposed at the central portion of the ceramic body in the thickness direction among internal electrodes in the cross-section of the ceramic body in the width-thickness direction at the center of the ceramic body in the length direction to a side surface of the ceramic body maximally adjacent to the widthwise ends may be measured, and an average value of the measured distances may be calculated to obtain D1. In addition, respective distances from widthwise ends of two to four internal electrodes disposed at the upper or lower portion of the ceramic body in the thickness direction among the internal electrodes to a side surface of the ceramic body maximally adjacent to the widthwise ends may be measured, and an average value of the measured distances may be calculated to obtain D2.

D1/D2 may be adjusted by controlling thicknesses of the internal electrodes and sintering profile.

According to an exemplary embodiment of the present disclosure, a plurality of internal electrodes in the multilayer ceramic capacitor may have different thicknesses. By adjusting D1/D2 through the control of the thicknesses of the internal electrodes and the sintering profile, it would be easy to obtain a ceramic body capable of implementing a target capacitance and facilitating the application of a paste for external electrodes.

According to an exemplary embodiment of the present disclosure, when a thickness of an internal electrode disposed at a central portion of the ceramic body in a thickness direction thereof (hereinafter, also referred to as the "central internal electrode") is defined as a and a thickness of an internal electrode disposed at a cover portion of the ceramic body in the thickness direction thereof (hereinafter, also referred to as the "cover portion internal electrode") is defined as b, a is greater than b (a>b) in order to satisfy the following Equation: $0.5 \leq D1/D2 \leq 0.95$. In other words, the central internal electrode may be thicker than the cover portion internal electrode.

According to an exemplary embodiment of the present disclosure, when a thickness of the central internal electrode 120A is defined as a and a thickness of the cover portion internal electrode 120B is defined as b, the thicknesses of the internal electrodes may be adjusted so that a/b is in a range of 1.05 to 1.80 ($1.05 \leq a/b \leq 1.80$), in order to satisfy $0.5 \leq D1/D2 \leq 0.95$.

According to an exemplary embodiment of the present disclosure, when a thickness of the central internal electrode before sintering is defined as a' and a thickness of the cover portion internal electrode before sintering is defined as b', a thickness ratio (a'/b') of the internal electrodes before sintering may be in a range of 1.05 to 1.90 ($1.05 \leq a'/b' \leq 1.90$), in order to satisfy $0.5 \leq D1/D2 \leq 0.95$.

Referring to FIGS. 2A and 2B, the central internal electrode 120A may include internal electrodes disposed at the central portion of the ceramic body in the stacked direction of the first and second internal electrodes. Particularly, the first and second internal electrodes disposed at the central portion are represented by 121A and 122A, respectively.

The cover portion internal electrode 120B may include four internal electrodes sequentially disposed from the top except for an uppermost internal electrode or four internal electrodes sequentially disposed from the bottom except for a lowermost internal electrode.

Particularly, the first and second internal electrodes disposed at the cover portion are represented by 121B and 122B, respectively.

Details thereof will be described in Experimental Examples below. A thickness ratio (a/b) between the central internal electrode and the cover portion internal electrode and a width ratio (D1/D2) between the central margin portion and the upper or lower margin portion may be in proportion to each other, and the width ratio (D1/D2) between the central margin portion and the upper or lower side margin portion may be controlled by adjusting the thickness ratio (a/b) between the central internal electrode and the cover portion internal electrode.

In the case in which D1/D2 is less than 0.5, the side surface of the ceramic body may be excessively concave inwardly. In this case, when a paste for external electrodes is applied to outer surfaces of the ceramic body in order to form the external electrodes, the application of the paste for external electrodes may be deteriorated, and accordingly, connectivity between the external electrodes and the internal electrodes may be deteriorated, resulting in a decrease in capacitance. In addition, during a polishing process of the ceramic body, the generation of chipping defects such as cracking or breaking generated in the ceramic body may be increased.

Further, in the case in which D1/D2 is greater than 0.95, a target capacitance may not be implemented. In detail, in order to allow D1/D2 to exceed 0.95, the ratio a/b of the thickness a of the central internal electrode to the thickness b of the cover portion internal electrode needs to be greater than 1.8. In this case, the number of stacked internal electrodes may be reduced due to an increase in the thickness of the central internal electrode, resulting in a failure in achieving the target capacitance.

Further, when a thickness of the dielectric layer is defined as Td, the multilayer ceramic capacitor according to the exemplary embodiment of the present disclosure may be manufactured to satisfy $0.5 \leq a/Td \leq 1.2$. The thicknesses of the internal electrodes and the dielectric layers are controlled to prevent generation of contraction cracking and delamination. In the case in which $a/Td$ is greater than 1.2, the contraction cracking or delamination may be generated during a sintering process, and in the case in which $a/Td$ is less than 0.5, it may be difficult to implement the target capacitance.

Therefore, $a/Td$ may be 0.5 to 1.2.

Further, the thickness of the central internal electrode may be appropriately determined according to intended use, or the like, and may be 0.1 μm to 0.5 μm, but is not limited thereto.

The thickness of the central internal electrode and the thickness of the cover portion internal electrode may refer to an average thickness thereof disposed between the dielectric layers.

The respective average thicknesses of the central internal electrode and the cover portion internal electrode may be measured from an image obtained by scanning the cross-section of the ceramic body 110 in the length-thickness (L-T) direction using a scanning electron microscope (SEM).

For example, with respect to any internal electrode extracted from the image obtained by scanning the cross-section of the ceramic body 110 in the length and thickness (L-T) direction cut in a central portion of the ceramic body 110 in the width (W) direction using the scanning electron microscope (SEM), thicknesses of the internal electrode may be measured at thirty equidistant points thereof in the length direction to calculate an average value thereof.

Further, in order to obtain desired capacitance, average electrode continuity of the first and second internal electrodes 121 and 122 may be 85% or more. With respect to any internal electrode extracted from the image obtained by scanning the cross-section of the ceramic body 110 in the length and thickness (L-T) direction, a ratio of an actual total length of the internal electrode corresponding to the sum of electrode portions to a distance (length) from one end of the internal electrode to the other end thereof may be measured to determine the continuity of the internal electrode.

The first and second internal electrodes may contain at least one selected from a group consisting of nickel (Ni), manganese (Mn), chromium (Cr), copper (Cu), palladium (Pd), silver (Ag), cobalt (Co), and aluminum (Al), but are not limited thereto.

The first and second external electrodes 131 and 132 may be formed on the outer surfaces of the ceramic body 110 and electrically connected to the first and second internal electrodes 121 and 122, respectively.

For example, the first external electrode 131 may be electrically connected to the first internal electrodes 121 exposed to the first end surface of the ceramic body 110 and the second external electrode 132 may be electrically connected to the second internal electrodes 122 exposed to the second end surface of the ceramic body 110.

In addition, although not shown, a plurality of external electrodes may be formed in order to be connected to the first and second internal electrodes exposed to the surfaces of the ceramic body.

The first and second external electrodes 131 and 132 may be formed of a conductive paste containing metal powder.

The metal power contained in the conductive paste is not particularly limited. For example, nickel (Ni), copper (Cu), or an alloy thereof may be used.

Hereinafter, a method of manufacturing a multilayer ceramic capacitor according to an exemplary embodiment of the present disclosure will be described, but is not limited thereto.

In addition, redundant descriptions on the same or similar elements of the above-described multilayer ceramic capacitor will be omitted.

In the method of manufacturing a multilayer ceramic capacitor according to an exemplary embodiment of the present disclosure, first of all, slurry containing a powder such as barium titanate ($BaTiO_3$) powder, or the like, may be applied to carrier films and dried to prepare a plurality of ceramic green sheets, thereby forming dielectric layers and cover layers.

The ceramic green sheet may be manufactured by mixing a ceramic powder, a binder, and a solvent to prepare the slurry and forming a sheet having a predetermined thickness using the slurry by a doctor blade method.

Next, a conductive paste for internal electrodes including a conductive powder may be prepared, and the conductive paste for internal electrodes may be printed on the individual ceramic green sheets, thereby forming internal electrode patterns.

The internal electrode patterns do not have the same thickness. When a thickness of an internal electrode pattern to be disposed at a central portion of a ceramic body after stacking the ceramic green sheets is defined as a' and a thickness of an internal electrode pattern to be disposed at a cover portion of the ceramic body after stacking is defined as b', the internal electrode patterns may be formed on the green sheets while satisfying $1.05 \leq a'/b' \leq 1.90$.

The conductive powder may contain at least one selected from a group consisting of nickel (Ni), manganese (Mn), chromium (Cr), copper (Cu), palladium (Pd), silver (Ag), cobalt (Co), and aluminum (Al), but is not limited thereto.

Then, the plurality of ceramic green sheets having the internal electrode patterns printed thereon may be stacked to form a multilayer body, and a plurality of ceramic green sheets having no internal electrode pattern may be stacked on upper and lower surfaces of the multilayer body. Then, the multilayer body may be cut such that one ends of the internal electrode patterns are alternately exposed, thereby preparing a multilayer chip.

When the thickness of the internal electrode pattern disposed at a central portion of the multilayer chip is defined as a' and the thickness of the internal electrode pattern disposed at a cover portion of the multilayer chip is defined as b', a'/b' may be in a range of 1.05 to 1.90 ($1.05 \leq a'/b' \leq 1.90$).

In the case in which a'/b' is less than 1.05, a side surface of the ceramic body may be excessively concave, such that it may be difficult to apply a paste for external electrodes to the ceramic body, and in the case in which a'/b' is greater than 1.90, a target capacitance may not be implemented due to an increase in the thickness of the internal electrode disposed at the central portion.

Thereafter, the multilayer chip may be sintered, thereby forming the ceramic body 110.

The sintering of the multilayer chip may include maintaining the multilayer chip for a predetermined time in two or more temperature sections during the sintering process.

For example, the sintering of the multilayer chip may include maintaining the multilayer chip for a predetermined time in a first temperature section and then maintaining the multilayer chip for a predetermined time in a second temperature section. A time for which the multilayer chip is maintained in the first temperature section may be 120 to 180 minutes, and a time for which the multilayer chip is maintained in the second temperature section may be 150 to 300 minutes.

When a sintering temperature of the internal electrode pattern is defined as P and a sintering temperature of the green sheet is defined as Q, the first temperature section may be equal to or greater than P in a range of Q-200° C. to Q-100° C. and the second temperature section may be in a range of Q-50° C. to Q° C.

Substantially, the internal electrode patterns may be sintered in the first temperature section and the green sheets may be sintered in the second temperature section. In this case, the previously sintered internal electrodes may suppress the green sheets from being contracted in length and width directions and induce contraction of the green sheets in a thickness direction in the second temperature section.

In the case of a highly stacked multilayer ceramic capacitor (MLCC), a side surface of a ceramic body may be curved inwardly to thereby be concave due to a difference in contraction behavior between a cover portion and an internal electrode formation portion.

However, according to the exemplary embodiment of the present disclosure, the internal electrodes at the central portion of the ceramic body are thick, such that the effect of the previously sintered internal electrodes suppressing the green sheets from being contracted in the length and width directions and inducing the contraction of the green sheets in the thickness direction may be significantly enhanced at the central portion of the ceramic body, thereby preventing the side surface of the ceramic body from being excessively concave inwardly.

According to the exemplary embodiment of the present disclosure, the multilayer chip and the internal electrodes are sintered together with each other, but the shape of the ceramic body may be controlled by performing the sintering process in two or more temperature sections and adjusting the thicknesses of the internal electrodes to be different.

The ceramic body may include the internal electrodes 121 and 122, the dielectric layers 111, and the cover layers, wherein the dielectric layers are formed by sintering the green sheets having the internal electrode patterns printed thereon, and the cover layers are formed by sintering the green sheets having no internal electrode.

A width of a margin portion of the ceramic body in the width direction may be controlled due to the shape of the internal electrodes as described above.

According to an exemplary embodiment of the present disclosure, in the case in which a distance between a widthwise end of an internal electrode disposed at the central portion of the ceramic body in the thickness direction of the ceramic body and an adjacent side surface of the ceramic body is defined as D1, and a distance between a widthwise end of an internal electrode disposed at the upper or lower portion of the ceramic body in the thickness direction of the ceramic body and the adjacent side surface of the ceramic body is defined as D2, D1/D2 may be in a range of 0.5 to 0.95 ($0.5 \leq D1/D2 \leq 0.95$).

The internal electrodes may include the first and second internal electrodes.

Then, the first and second electrode layers 131 and 132 may be formed on the outer surfaces of the ceramic body so as to be electrically connected to the first and second internal electrodes, respectively. The first and second external electrodes may be formed by applying a paste containing a conductive metal and glass to the outer surfaces of the ceramic body and sintering the applied paste.

The conductive metal is not particularly limited, but may be, for example, at least one selected from a group consisting of copper (Cu), silver (Ag), nickel (Ni), and alloys thereof.

The glass is not particularly limited, but may be a material having the same composition as that of glass used to form external electrodes of a general multilayer ceramic capacitor.

Further, the first and second external electrodes 131 and 132 may further include conductive resin layers (not shown) formed by applying a conductive resin composition containing a conductive powder to outer surfaces of the first and second external electrodes 131 and 132 and then curing the conductive resin composition. The conductive resin composition may contain the conductive powder and a base resin, wherein the base resin may be an epoxy resin, which is a thermosetting resin.

The method of manufacturing a multilayer ceramic capacitor according to the embodiment of the present disclosure may further include forming a nickel plating layer and a tin plating layer after forming the conductive resin layers.

According to the exemplary embodiment of the present disclosure, the shape of the ceramic body may be improved, such that it may be easy to apply the paste for external electrodes to the ceramic body, whereby a multilayer ceramic capacitor may obtain excellent connectivity between the external electrodes and the internal electrodes and the desired capacitance.

Board Having Multilayer Ceramic Electronic Component Mounted Thereon

Figure 3:
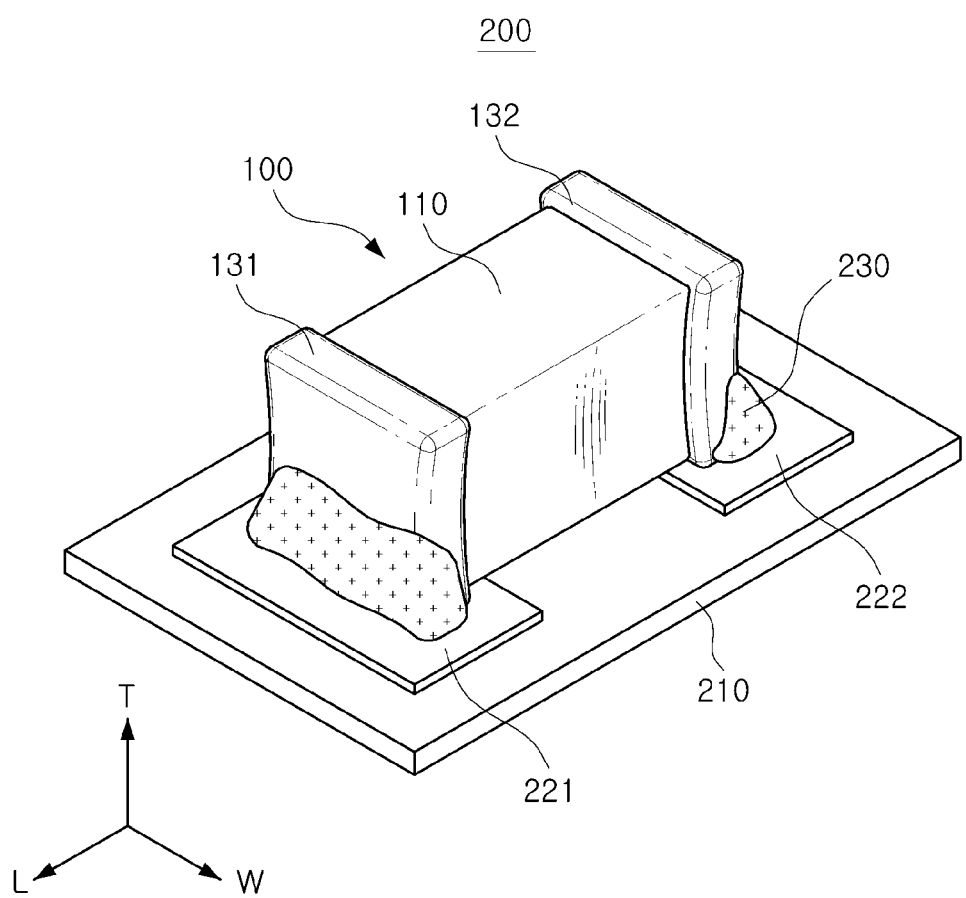
FIG. 3 is a schematic perspective view of a board having a multilayer ceramic capacitor mounted thereon according to another exemplary embodiment of the present disclosure.

FIG. 3 is a schematic perspective view of a board having a multilayer ceramic electronic component mounted thereon according to another exemplary embodiment of the present disclosure.

Referring to FIG. 3, a board 200 having a multilayer ceramic electronic component mounted thereon according to this exemplary embodiment may include a printed circuit board 210 having first and second electrode pads 221 and 222 disposed thereon; and a multilayer ceramic electronic component 100 mounted on the printed circuit board 210, wherein the multilayer ceramic electronic component includes a ceramic body including dielectric layers and a plurality of internal electrodes disposed in the ceramic body, having at least one of the dielectric layers interposed therebetween, and when a distance between a widthwise end of an internal electrode disposed at a central portion of the ceramic body in a thickness direction of the ceramic body and an adjacent side surface of the ceramic body is defined as D1, and a distance between a widthwise end of an internal electrode disposed at an upper or lower portion of the ceramic body in the thickness direction of the ceramic body and the adjacent side surface of the ceramic body is defined as D2, D1/D2 is in a range of 0.5 to 0.95 ($0.5 \leq D1/D2 \leq 0.95$).

The multilayer ceramic electronic component may include first and second external electrodes 131 and 132, wherein the first and second external electrodes 131 and 132 may be connected to the first and second electrode pads 221 and 222 by a solder 230.

In this exemplary embodiment, since a description of the multilayer ceramic capacitor 100 mounted on the printed circuit board 210 is the same as that of the above-mentioned multilayer ceramic capacitor, details thereof will be omitted.

Experimental Examples

Data in the following Table 1 indicate, in a process of manufacturing a multilayer ceramic capacitor, a thickness ratio between a central internal electrode and a cover portion internal electrode after sintering depending on a thickness ratio between the central internal electrode and the cover portion internal electrode before sintering, a chipping defect generation rate during a polishing process of a ceramic body, an application of external electrodes, and whether or not a target capacitance is obtained.

Multilayer ceramic capacitors according to Experimental Examples were manufactured as follows.

First, slurry containing a powder such as a barium titanate ($BaTiO_3$) powder, or the like, was applied to carrier films and dried to prepare a plurality of ceramic green sheets, thereby forming dielectric layers.

Then, a conductive paste for internal electrodes was applied to the green sheets by a screen printing method to thereby form internal electrodes, and the green sheets were then stacked in an amount of 250 layers to thereby form a multilayer body.

The internal electrodes were manufactured to have different thicknesses according to b/a in the following Table 1.

Then, the multilayer body was compressed and cut into chips having a 0603 standard size, and then the chips were sintered under a reducing atmosphere in which $H_2$ is 0.1% or less.

Next, the sintered ceramic bodies were polished together with zirconia balls having a size of 0.5 mm to 3 mm using a liquid containing water as a solvent, and then a paste for external electrodes was applied to end surfaces of each ceramic body and sintered, thereby forming external electrodes. The liquid may contain a surfactant facilitating washing of ceramic byproducts, or the like.

Next, processes such as a plating process, and the like, were performed on the external electrodes and multilayer ceramic capacitors were manufactured, and then characteristics thereof were evaluated.

The chipping defect generation rate was evaluated by observing the number of chips suffering from cracking or breaking occurred in the ceramic body after performing the polishing process. In the case in which capacitance was decreased by 10% or more as compared to the designed capacitance of a capacitor (for example, in the case in which the capacitor had capacitance of 4.23 uF or less, even with the target capacitance being 4.7 uF), it was determined that the capacitor failed to obtain the satisfied capacitance.

With regard to the application of the external electrodes, in a case in which as a result of observing a cross-section of the ceramic body in a length-thickness direction (FIG. 2A), the external electrode and the ceramic body did not contact each other and accordingly a void having a diameter of 15 μm or larger was observed in the vicinity of a boundary between the external electrodes and the ceramic body, it was determined that the application of the external electrodes was poor.

In experimental data of Table 1, the multilayer ceramic capacitors were manufactured so that a thickness ratio between the central internal electrode and the dielectric layer was 1:1.

TABLE 1

| Sample | a'/b' | a/b | D1/D2 | Chipping Defect Generation Rate | Target Capacitance | Application of External Electrodes |
|---|---|---|---|---|---|---|
| 1* | 0.95 | 0.95 | 0.45 | x | x | x |
| 2* | 0.975 | 0.975 | 0.46 | x | x | x |
| 3* | 1.00 | 1.00 | 0.47 | Δ | x | x |
| 4* | 1.025 | 1.025 | 0.48 | Δ | x | x |
| 5 | 1.05 | 1.05 | 0.50 | ○ | ○ | ○ |
| 6 | 1.10 | 0.10 | 0.55 | ○ | ○ | ○ |
| 7 | 1.20 | 1.18 | 0.60 | ○ | ○ | ○ |
| 8 | 1.30 | 1.28 | 0.65 | ○ | ○ | ○ |
| 9 | 1.40 | 1.37 | 0.70 | ○ | ○ | ○ |
| 10 | 1.50 | 1.46 | 0.75 | ○ | ○ | ○ |
| 11 | 1.60 | 1.55 | 0.80 | ○ | ○ | ○ |
| 12 | 1.70 | 1.63 | 0.85 | ○ | ○ | ○ |
| 13 | 1.80 | 1.72 | 0.90 | ○ | ○ | ○ |
| 14 | 1.90 | 1.80 | 0.95 | ○ | ○ | ○ |
| 15* | 2.00 | 1.90 | 1.00 | ○ | x | ○ |
| 16* | 2.50 | 2.38 | 1.15 | ○ | x | ○ |

*Comparative Examples
○: The chipping defect generation rate was less than 1%, the target capacitance was obtained, or the application of the external electrode was satisfactory.
Δ: The chipping defect generation rate was 1% to 5%.
x: The chipping defect generation rate was 5% or greater, the target capacitance was not obtained, or the application of the external electrodes was poor.

As shown in Table 1, it may be confirmed that in the case in which D1/D2 was less than 0.5, the chipping defect generation rate was high and the target capacitance was not obtained due to deterioration in the application of the external electrodes.

Further, it may be appreciated that in the case in which D1/D2 was greater than 0.95, the central internal electrode became thick, and thus the target capacitance was not obtained.

Therefore, it is preferable that D1/D2 is in a range of 0.5 to 0.95 (0.5≤D1/D2≤0.95).

Data in the following Table 2 indicate, with respect to the multilayer ceramic capacitors manufactured by the above-described method, whether or not contraction cracking occurred according to a ratio (a/Td) between the thickness a of the central internal electrode and the thickness Td of the dielectric layer and whether or not a target capacitance was obtained.

TABLE 2

| Sample | a/Td | Target Capacitance | Occurrence of Cracking |
|---|---|---|---|
| 17* | 0.3 | x | x |
| 18* | 0.4 | x | x |
| 19 | 0.5 | ○ | x |
| 20 | 0.8 | ○ | x |
| 21 | 1.2 | ○ | x |
| 22* | 1.5 | ○ | ○ |
| 23* | 2.0 | ○ | ○ |
| 24* | 2.5 | ○ | ○ |

*Comparative Example
○: A crack was generated after sintering, or the capacitance was 90% or greater of the target capacitance.
x: A crack was not generated after sintering, or the capacitance was less than 90% of the target capacitance.

Referring to Table 2, in samples 17 and 18 corresponding to Comparative Examples in which a/Td was less than 0.5, the target capacitance was not obtained, and in samples 22 to 24 corresponding to other Comparative Examples in which a/Td was greater than 1.2, the crack was generated after sintering, causing a reliability problem.

It may be appreciated that in samples 19 to 21 corresponding to Inventive Examples in which the numerical ranges of the present disclosure were satisfied, the crack was not generated after sintering and the target capacitance was obtained, whereby a high capacitance multilayer ceramic capacitor having excellent reliability may be provided.

As set forth above, according to exemplary embodiments of the present disclosure, a multilayer ceramic electronic component having high capacitance and improved reliability, and a board having the same mounted thereon may be provided.

While exemplary embodiments have been shown and described above, it will be apparent to those skilled in the art that modifications and variations could be made without departing from the spirit and scope of the present disclosure as defined by the appended claims.

What is claimed is:

1. A multilayer ceramic electronic component comprising:
a ceramic body including dielectric layers; and
a plurality of internal electrodes disposed in the ceramic body, having at least one of the dielectric layers interposed therebetween,
wherein when a distance between a widthwise end of an internal electrode disposed at a central portion of the ceramic body in a thickness direction thereof and an adjacent side surface of the ceramic body is defined as D1 and a distance between a widthwise end of an internal electrode disposed at an upper or lower portion of the ceramic body in the thickness direction thereof and the adjacent side surface of the ceramic body is defined as D2, D1/D2 is in a range of 0.5 to 0.95 ($0.5 \leq D1/D2 \leq 0.95$).

2. The multilayer ceramic electronic component of claim 1, wherein when a thickness of a central internal electrode is defined as a and a thickness of a cover portion internal electrode is defined as b, a is greater than b (a>b).

3. The multilayer ceramic electronic component of claim 1, wherein when a thickness of a central internal electrode is defined as a and a thickness of a cover portion internal electrode is defined as b, a/b is in a range of 1.05 to 1.80 ($1.05 \leq a/b \leq 1.80$).

4. The multilayer ceramic electronic component of claim 1, wherein when a thickness of a central internal electrode is defined as a and a thickness of the dielectric layer is defined as Td, a/Td is in a range of 0.5 to 1.2 ($0.5 \leq a/Td \leq 1.2$).

5. The multilayer ceramic electronic component of claim 1, wherein a thickness of a central internal electrode is 0.1 μm to 0.5 μm.

6. The multilayer ceramic electronic component of claim 1, wherein a thickness of the dielectric layer is 0.6 μm or less.

7. The multilayer ceramic electronic component of claim 1, wherein average electrode continuity of the internal electrodes is 85% or more.

8. A board having a multilayer ceramic electronic component mounted thereon, the board comprising:
a printed circuit board having electrode pads thereon; and
the multilayer ceramic electronic component mounted on the printed circuit board,
wherein the multilayer ceramic electronic component includes:
a ceramic body including dielectric layers; and
a plurality of internal electrodes disposed in the ceramic body, having at least one of the dielectric layers interposed therebetween, and
when a distance between a widthwise end of an internal electrode disposed at a central portion of the ceramic body in a thickness direction thereof and an adjacent side surface of the ceramic body is defined as D1 and a distance between a widthwise end of an internal electrode disposed at an upper or lower portion of the ceramic body in the thickness direction thereof and the adjacent side surface of the ceramic body is defined as D2, D1/D2 is in a range of 0.5 to 0.95 ($0.5 \leq D1/D2 \leq 0.95$).

9. The board of claim 8, wherein when a thickness of a central internal electrode is defined as a and a thickness of a cover portion internal electrode is defined as b, a is greater than b (a>b).

10. The board of claim 8, wherein when a thickness of a central internal electrode is defined as a and a thickness of a cover portion internal electrode is defined as b, a/b is in a range of 1.05 to 1.80 ($1.05 \leq a/b \leq 1.80$).

11. The board of claim 8, wherein when a thickness of a central internal electrode is defined as a and a thickness of the dielectric layer is defined as Td, a/Td is in a range of 0.5 to 1.2 ($0.5 \leq a/Td \leq 1.2$).

* * * * *